3,030,270
Patented Apr. 17, 1962

3,030,270
ANTIPARASITIC COMPOSITIONS AND PROCESSES
Raymond Fred Shumard, Greenfield, Ind., assignor to Eli Lilly and Company, Indianapolis, Ind., a corporation of Indiana
No Drawing. Filed Oct. 5, 1959, Ser. No. 844,184
17 Claims. (Cl. 167—53.1)

This invention relates to improved antiparasitic compositions useful in the treatment and control of coccidiosis, and to processes relating thereto. More particularly, it relates to those antiparasitic compositions containing hygromycin B or an acid addition salt thereof.

One of the most common and costly problems encountered in poultry is the disease of coccidiosis. The problem is especially great in the much expanded broiler industry since the close proximity of the birds while being grown is conducive to coccidiosis infection and its rapid spread. Infection is caused by the invasion of the birds with protozoa of microscopic size called coccidia, belonging to the genus Eimeria. Coccidiosis is additionally a disease problem in other animals such as lambs and calves although of less concern than it is in the poultry industry.

Host animals, e.g. chickens, initiate their infection by the ingestion, usually along with food- or water-intake, of Eimeria organisms in the sporulated oocyst stage. When the ingested oocysts enter the intestine, the infecting stage of the Eimeria soon develops from the oocysts and causes extensive damage to the the inner walls of the intestine and the cecum, or "intestinal pouch."

There are two types of coccidiosis infections in chickens: The first type called acute or cecal coccidiosis is caused by the organism *Eimeria tenella* and results in destruction to the cecal linings of the host. In an outbreak of cecal coccidiosis, the flock becomes seriously infected with little or no forewarning, and a very high mortality will customarily result unless the birds are promptly treated with a coccidiostatic agent. Coccidiostatic rather than coccidiocidal agents are preferred since the former permit some immunity development in the infected host. Chronic or intestinal coccidiosis causes destruction of the cells in the intestinal linings but does not generally result in the high mortality associated with cecal infections. The chronic infections can be caused by various species of Eimeria which are in general specific to the host animal.

Animals that do survive either type of infection are usually of greatly lessened economic value inasmuch as they are quite inefficient in converting feed to weight gains, grow much more slowly than normal animals, and frequently appear listless and unthrifty.

A number of coccidiostatic agents are presently available for either the treatment or prevention of coccidiosis, and some of these agents are effective in preventing the high mortalities. However, whether normal, uninfected animals are administered a preventive dosage of a presently available coccidiostatic agent or infected animals are so treated with a therapeutic dosage, the treated animals usually show a lower feed efficiency and less rapid weight gains than those of normal, untreated animals. Thus, a grower of broilers, for example, is in the dilemma of electing to use no preventive treatment thereby risking a coccidiosis outbreak, or to employ the preventive treatment with its diminishment of feed efficiency and rate of weight gain. Greatly desired, therefore, are improved antiparasitic compositions which are effective in the treatment and control of coccidiosis but which are without the quality of causing extensive depression of feed efficiency and growth.

It is the object of this invention to provide improved antiparasitic compositions effective in the control and treatment of coccidiosis which do not cause the depression of feed efficiency and growth rate presently encountered. A further object of this invention is to provide improved methods in the treatment and control of coccidiosis. Other objects of this invention will be apparent to those skilled in the art from the description which follows.

The improved antiparasitic compositions of this invention comprise the antibiotic hygromycin B or one of its nontoxic acid addition salts in combination with a coccidiostatic agent. This combination provides enhanced weight growth as well as greater feed efficiency among animals such as chickens exposed to coccidiosis infection over that obtained when effective quantities of the coccidiostatic agent alone is administered. Also, within the scope of this invention are processes of treatment and control of coccidiosis infections by employing the compositions of this invention.

The improved coccidiostatic action of the compositions of this invention is highly surprising in view of the observation that hygromycin B when administered to uninfected control animals, has no significant, beneficial action on feed efficiency or growth rate. Furthermore, when hygromycin B or any of its acid addition salts is administered to infected animals receiving no simultaneous coccidiostatic agent, there is no apparent, significant coccidiostatic action provided thereby.

The hygromycin B employed in this invention is an antibiotic compound produced by an actinomycete of the species *Streptomyces hygroscopicus*, and is described and defined in the J. of Amer. Chem. Soc. 80, 2714 (1948). A method of preparation of hygromycin B is disclosed in Antibiotics and Chemotherapy 3, 1268 (1953). Since hygromycin B is a nitrogenous base, the acid addition salts thereof can be prepared following procedures customarily employed in the art to provide acid addition salts from such nitrogenous bases. Some of the acid addition salts which are preferred in the practice of this invention include the hydrochloric acid, the phosphoric acid, and sulfuric acid addition salts.

The coccidiostatic agent ingredient employed in the compositions can consist of a single chemical compound having coccidiostatic activity or a combination of such compounds. Coccidiostatic agents which can be employed in the compositions of this invention include but are not limited to the following: arsenosobenzene compounds disclosed in U.S. Patent No. 2,800,425; nitrofurans disclosed in U.S. Patent No. 2,319,481, for example, 5-nitro-2-furaldehyde semicarbazone; 3,5-dinitro-o-toluamide and 3,5-dinitrobenzamide; acetyl-(p-nitrophenyl) sulfanilamide; 2,2'-thiobis (4,6-dichlorophenol), Arnold and Coulston, Toxicology and Applied Pharmacology, 1 (Sept. 1959), 475–86; 3,3'-dinitrophenyl disulfides disclosed in U.S. Patent No. 2,844,509; diamino substituted triazines disclosed in U.S. Patent No. 2,836,539; 3-nitro-4-hydroxy phenyl arsonic acid and salts thereof disclosed in U.S. Patent No. 2,450,866; substituted phenylureas disclosed in U.S. Patent No. 2,787,574; phenylurea complexes disclosed in U.S. Patent No. 2,731,383, for example, 4,4'-dinitrocarbanilide.2-hydroxy-4,6- dimethyl pyrimidine; 4,5-imidazoledicarboxamides and the related compounds disclosed in U.S. Patent No. 2,872,371; and sulfonamido coccidiostats such as sulfaquinoxaline, sulfamethazine, and sulfamerazine. The above coccidiostatic agents include all which presently have a substantial commercial importance.

The compositions are orally administered. They can be incorporated in the normal diet of the treated animal or can be added to the drinking water. It is, of course, possible to dose the animals by administration of the compositions in such form as pressed tablets or filled capsules. However, such individual administration is undesirable and impractical because of the increased cost and time involved. The presently preferred method of administration of the compositions is by means of addition to an animal feedstuff, for example, the normal diet. When a normal diet of the animal is employed as the extending medium for the compositions, any balanced ration containing the customary nutrient sources of protein, minerals, vitamins, and carbohydrates can be employed. If desired, the compositions can be employed in treatment by administering the active ingredients individually.

For the sake of convenience and insuring proper and thorough distribution of active ingredients of the composition throughout a feed mixture or the drinking water supply, it is desirable to incorporate initially the active ingredients of the compositions in a premix. For addition to feeds, the carrier of the premix can be any edible and compatible extending medium but is preferably a caloric extending medium such as soybean meal, corn oil meal cake, soybean mill feed, or the like. Alternatively, noncaloric extending media can be employed, e.g. bentonite, fuller's earth, oyster shell flour, and the like. If desired, such additional substances as dried fermentation residues or mycelia can be employed at least in part as the premix extending medium. Generally, it is desirable to employ water as an extending medium when the premix is to be added to drinking water. When the compositions are added to the drinking water, it is frequently advantageous to incorporate surface active agents, emulsifying agents, and the like which are tolerated by the animal species to be treated. Concentration of the active ingredients of premix composition should be selected in view of convenience and accurate compounding.

The active ingredients of the compositions can be thoroughly mixed and blended with the extending medium by finely grinding or pulverizing the ingredients using commercially available grinders, pulverizers, or hammer mills and by uniformly distributing the ground ingredients with commercially available feed mixers.

Stabilizers, flavors, coloring agents, and the like can be added to the compositions as desired.

The concentration of the coccidiostatic agent employed in the compositions is at most the same quantity which has been found recommendable for the treatment and control of coccidiosis when used alone. Frequently, it is possible and advisable to lower the concentration of the coccidiostatic agent in the compositions of this invention, since, in addition to the providing improvement of the growth rate and feed efficiency of the animals, the compositions appear to coact to provide antiparasitic activity greater than that provided solely by the coccidiostatic agent present. The concentration of hygromycin B or its acid addition salts in the combinations used are such that about 1 g. to about 100 g. of hygromycin B activity will be ingested by the animals per ton of feed consumed. Customarily, it is preferred to employ from about 3 g. to about 12 g. of hygromycin B activity per ton of ingested feed.

In respect to the treatment of broilers, it is preferred in accordance with present broiler practices to administer a preventive concentration of the compositions throughout the feeding period.

However, if such preventive practices are not followed and a disease outbreak occurs, an enhanced dosage rate should be utilized until the disease condition subsides. It will be advisable to administer an enhanced or therapeutic dosage for a period of, for example, at least six to ten days, depending upon the seriousness and nature of the outbreak and the species and age of the animals. After the therapeutic dosage period, treatment usually should be continued on a preventive basis.

The following are illustrative compositions employed in the practice of this invention.

EXAMPLE 1

*Solid Premix*

The following ingredients are combined and thoroughly mixed to provide a premix composition suitable for use in the treatment and control of coccidiosis:

Sulfaquinoxaline _____ g__ 1362
Hygromycin B _____ g__ 80
Soybean meal, added to make a total weight of
                                                              lb__ 10

The premix composition is combined with a normal ration. For example, about 0.6 lb. to 1.2 lb. of the premix composition is added to a ton of a normal broiler ration and evenly dispersed therein by thorough mixing.

In place of the sulfaquinoxaline employed in the above premix composition, other coccidiostatic agents (I–VIII) can be employed in the following quantities: (I) 5-nitro-2-furaldehyde semicarbazone, 500 g.; (II) arsenosobenzene, 227 g.; (III) 4,5-imidazoledicarboxamide, 272 g.; (IV) 2,2'-thiobis(4,6-dichlorophenol), 454 g., 4,6-diamino - 1 - (4 - methylmercaptophenyl) - 1,2 - dihydro-2,2-dimethyl-1,3,5-triazine, 2270 g.; (V) 4,4'-dinitrocarbanilide·2-hydroxy-4,6-dimethyl pyrimidine, 1135 g.; (VI) 3,5-dinitrobenzamide, 1135 g., acetyl-(p-nitrophenyl) sulfanilamide, 1362 g.; (VII) 3,5-dinitro-o-toluamide, 1000 g.; and (VIII) 2,4-diamino-5(p-chlorophenyl)-6-ethyl pyrimidine, 1360 g.

EXAMPLE 2

*Solid Premix*

The following ingredients are combined and thoroughly mixed to provide a premix composition suitable for use in the treatment and control of coccidiosis:

Sulfaquinoxaline _____ g__ 1362
Hygromycin B _____ g__ 80
Oyster shell flour, added to make a total weight of
                                                        lb__ 10

The premix composition is combined with a normal ration, for example, about 0.6 lb. to 1.2 lb. of the premix composition is added to a ton of a normal broiler ration and evenly dispersed therein by thorough mixing.

EXAMPLE 3

*Aqueous Concentrate*

An aqueous concentrate is prepared containing the following ingredients:

Sodium sulfaquinoxaline _____ g__ 768
Hygromycin B (as the hydrochloride acid addition
  salt) _____ g__ 17
Water, added to make a total volume of _____ gal__ 1.25

The concentrate is combined with the normal drinking water supply of the animals to be treated. For example, about 0.75 pt. (360 cc.) to 1.25 pt. (600 cc.) of the concentrate is added and thoroughly mixed with 50 gallons of the drinking water.

Other coccidiostatic agents can be employed in the preparation of aqueous concentrates in place of the sodium sulfaquinoxaline employed in the above composition.

EXAMPLE 4

Medicated Feeds

The following normal broiler ration is employed in preparing medicated feeds:

| | Pounds |
|---|---|
| Ground yellow corn | 1045 |
| Soybean meal (50%-protein-dehulled) | 550 |
| Fish meal | 100 |
| Animal fat | 80 |
| Meat scraps (55% protein) | 50 |
| Dehydrated alfalfa meal | 50 |
| Distillers solubles | 50 |
| Dried whey | 20 |
| Calcium carbonate | 20 |
| Dicalcium phosphate | 15 |
| Sodium chloride | 10 |
| Vitamin concentrate | 10 |
| Trace minerals | 2 |
| Total | 2002 |

The ingredients are combined in finely ground form and are thoroughly mixed.

Medicated feeds are prepared by adding the amounts of coccidiostatic agents (I–VIII) and hygromycin B to quantities of the broiler ration as set forth in the following table. The ingredients are thoroughly mixed to provide uniform mixtures. The coccidiostatic agent and the hygromycin B ingredients are preferably added to the broiler ration in the form of a premix.

TABLE I

| Feed Composition No. | Coccidiostatic Agent | Amount of Coccidiostatic Agent Added (g./t.) | Amount of Hygromycin B Added (g./t.) |
|---|---|---|---|
| I | 5-nitro-2-furaldehyde semicarbazone | 50 | 5 |
| II | arsenosobenzene | 18 | 8 |
| III | 4,5-imidazoledicarboxamide | 55 | 8 |
| IV | {2,2'-thiobis (4,6-dichlorophenol), 4,6-diamino-1-(4-methylmercaptophenyl)-1,2-dihydro-2,2-dimethyl-1,3,5-triazine. | 135, 675 | 8, 8 |
| V | 4,4-dinitrocarbanilide.2-hydroxy-4,6-dimethyl pyrimidine. | 180 | 8 |
| VI | 3,5-dinitrobenzamide | 230 | 8 |
|  | acetyl-(p-nitrophenyl)sulfanilamide | 270 | 8 |
| VII | 3,5-dinitro-o-toluamide | 100 | 8 |
| VIII | 2,4-diamino-5-(p-chlorophenyl)-6-ethyl pyrimidine. | 135 | 10 |

The medicated feeds are fed to broilers ad libitum to control coccidiosis infections.

I claim:
1. An antiparasitic composition useful in the treatment and control of coccidiosis infections, comprising a member of the group consisting of hygromycin B and its nontoxic acid addition salts, and an effective amount of a coccidiostatic agent.

2. An antiparasitic composition useful in the treatment and control of coccidiosis infections, comprising a member of the group consisting of hygromycin B and its nontoxic acid addition salts, an effective amount of a coccidiostatic agent, and an orally administrable extending medium.

3. A composition in accordance with claim 2 wherein the extending medium is an animal feedstuff.

4. An antiparasitic composition useful in the treatment and control of coccidiosis infections, comprising a member of the group consisting of hygromycin B and its nontoxic acid addition salts, and an effective amount of a sulfonamido coccidiostatic agent.

5. A composition in accordance with claim 4 wherein the sulfonamido coccidiostatic agent is sulfaquinoxaline.

6. An antiparasitic composition useful in the treatment and control of coccidiosis infections, comprising a member of the group consisting of hygromycin B and its nontoxic acid addition salts, and an effective amount of arsenosobenzene.

7. An antiparasitic composition useful in the treatment and control of coccidiosis infections, comprising a member of the group consisting of hygromycin B and its nontoxic acid addition salts, and an effective amount of 3,5-dinitrobenzamide.

8. An antiparasitic composition useful in the treatment and control of coccidiosis infections, comprising a member of the group consisting of hygromycin B and its nontoxic acid addition salts, and an effective amount of 5-nitro-2-furaldehyde semicarbazone.

9. An antiparasitic composition useful in the treatment and control of coccidiosis infections, comprising a member of the group consisting of hygromycin B and its nontoxic acid addition salts, and an effective amount of 2,2'-thiobis(4,6-dichlorophenol).

10. An antiparasitic premix composition useful in the treatment and control of coccidiosis infections comprising a member of the group consisting of hygromycin B and its nontoxic acid addition salts, an effective amount of a coccidiostatic agent, and an orally administrable extending medium.

11. A premix in accordance with claim 10 wherein the extending medium is a caloric feedstuff.

12. A medicated feed useful in the treatment and control of coccidiosis infections containing a member of the group consisting of hygromycin B and its nontoxic acid addition salts, and an effective amount of a coccidiostatic agent.

13. A medicated feed useful in the treatment and control of coccidiosis infections containing about 1 g. to about 100 g. per ton of a member of the group consisting of hygromycin B and its nontoxic acid addition salts, and an effective amount of a coccidiostatic agent.

14. A medicated feed useful in the treatment and control of coccidiosis infections containing about 5 g. per ton of a member of the group consisting of hygromycin B and its nontoxic acid addition salts, and an effective amount of a coccidiostatic agent.

15. A method of treatment and control of coccidiosis infections comprising administering to a host animal an antiparasitic composition comprising a member of the group consisting of hygromycin B and its nontoxic acid addition salts and an effective amount of a coccidostatic agent.

16. A method of treatment and control of coccidiosis infections by the administration to a host animal of an antiparasitic composition, said composition comprising a member of the group consisting of hygromycin B and its nontoxic acid addition salts in a quantity on the basis of ingested feed of about 1 g. to about 100 g. per ton, and an effective amount of a coccidiostatic agent.

17. An antiparasitic composition useful in the treatment and control of coccidiosis infections, comprising a member of the group consisting of hygromycin B and its nontoxic acid addition salts, and an effective amount of a coccidiostatic agent comprising a mixture of 2,2'-thiobis(4,6-dichlorophenol) and 4,6-diamino-1-(4-methylmercaptophenyl) - 1,2 - dihydro - 2,2 - dimethyl - 1,3,5-triazine.

References Cited in the file of this patent

UNITED STATES PATENTS

| 2,542,688 | Johnson | Feb. 20, 1951 |
| 2,818,370 | Schock | Dec. 31, 1957 |

OTHER REFERENCES

Feedstuff, July 12, 1958, pages 76 and 78.